United States Patent [19]

Enomoto et al.

[11] Patent Number: 5,229,449

[45] Date of Patent: Jul. 20, 1993

[54] COPOLYMER OF POLYMERIZABLE COMPONENTS IN NAPHTHA OIL AND MALEIC ANHYDRIDE, PROCESS FOR PRODUCING SAID COPOLYMER, AND DERIVATIVES THEREOF

[75] Inventors: Norihide Enomoto; Yoshihiro Naruse; Keiji Sugiura; Kimiyo Ohtsu; Masato Takagi, all of Chiba, Japan

[73] Assignee: Kawasaki Steel Corporation, Tokyo, Japan

[21] Appl. No.: 910,231

[22] Filed: Jul. 9, 1992

Related U.S. Application Data

[62] Division of Ser. No. 819,409, Jan. 10, 1992, Pat. No. 5,166,275, which is a division of Ser. No. 372,306, Jun. 27, 1989, abandoned.

[30] Foreign Application Priority Data

| Jun. 30, 1988 | [JP] | Japan | 63-16325 |
| Jul. 19, 1988 | [JP] | Japan | 63-179460 |
| Apr. 14, 1989 | [JP] | Japan | 1-96154 |
| Apr. 14, 1989 | [JP] | Japan | 1-96155 |
| Apr. 14, 1989 | [JP] | Japan | 1-96156 |

[51] Int. Cl.$^5$ .............. C08K 3/34; C08F 228/02; C08F 220/10
[52] U.S. Cl. .............. 524/446; 525/327.5; 526/272
[58] Field of Search .............. 525/327.5; 524/446

[56] References Cited

U.S. PATENT DOCUMENTS

4,581,147  4/1986  Branch, III .............. 252/8.5 C

Primary Examiner—Joseph L. Schofer
Assistant Examiner—Wu C. Cheng
Attorney, Agent, or Firm—Bierman and Muserlian

[57] ABSTRACT

Copolymer of maleic anhydride and the polymerizable component of naphtha oil chiefly composed of indene and aromatic hydrocarbons having a reactive double bond, a resin modifier containing said copolymer as an effective ingredient, a dispersant containing a salt of the sulfonation product of said copolymer, an esterified product of said copolymer, and preferred processes for producing these products.

5 Claims, 1 Drawing Sheet

F I G. 1

COPOLYMER OF POLYMERIZABLE COMPONENTS IN NAPHTHA OIL AND MALEIC ANHYDRIDE, PROCESS FOR PRODUCING SAID COPOLYMER, AND DERIVATIVES THEREOF

PRIOR APPLICATION

This application is a division of U.S. patent application Ser. No. 819,409 filed Jan. 10, 1992, now U.S. Pat. No. 5,166,275, which in turn is a division of U.S. patent application Ser. No. 372,306 filed Jun. 27, 1989, now abandoned.

BACKGROUND OF THE INVENTION

The present invention relates to a copolymer of maleic anhydride and indene, an indene-based component having a reactive double bond, or other polymerizable components in naphtha oil. In particular, the present invention relates to efficient utilization of naphtha oil. The copolymer obtained by the present invention is useful as a resin modifier. The sulfonation product of the copolymer may be converted to a water-soluble salt form such as an alkali metal salt, an alkaline earth metal salt or an ammonium salt. These salts are useful as dispersants for dyes, pigments or ceramics, dispersants for coal-water slurries, stabilizers for drilling fluids or muds used in drilling geothermal, oil, or natural gas development wells, slump loss reducing plasticizer in cement mixes, textile aids, paper sizes, water treating agents, and as additives in printing inks.

The copolymer may also be esterified with alcohols and the resulting esterified product finds versatile use in such applications as paints, ink dispersants, adhesives, and leveling agents in floor polishing waxes.

Numerous techniques have been proposed regarding copolymers of maleic anhydride and monomers having reactive double bonds, as well as processes for producing them. Techniques for producing a styrene-maleic anhydride copolymer have been described in Japanese Patent Public Disclosure No. 60-206808, Japanese Patent Publication No. 48-43664, Japanese Patent Public Disclosure No. 62-197406, etc. These prior patents disclose a process for producing a styrene-maleic anhydride copolymer having a weight average molecular weight of not higher than 10,000, a method of regulating the molecular weight distribution of the copolymer by adding a dialkylaniline to the polymerization system for preparing the styrene-maleic anhydride copolymer, as well as an observation that describes the interrelationship between the rate of addition of a styrene-maleic anhydride monomer mixture to the reaction system, reaction temperature and the concentration of polymerization initiator. Japanese Patent Public Disclosure No. 62-3165 discloses the polymerization of an alkyl-styrene-styrene mixture and maleic anhydride.

Japanese Patent Public Disclosure No. 56-34006, Japanese Patent Public Disclosure No. 61-60084, Japanese Patent Public Disclosure No. 54-71136, etc. disclose a process for producing a copolymer of maleic anhydride and an alkene or diene having 4-6 carbon atoms such as butene, butadiene or isoprene. Thus, numerous techniques have become known regarding copolymers of maleic anhydride and hydrocarbons such as linear dienes or alkenes, or styrene or metylstyrene.

Makromol. Chem. 62, 120 (1963) describes copolymers of maleic anhydride and polymerizable components in naphtha oil but the yield of the resulting copolymer is as low as 76%. What is more, no mention is made of the composition of the naphtha oil used or the composition or molecular weight of the copolymer obtained.

Unlike styrene, indene which represents a major percentage of the polymerizable components (monomers having a reactive double bond) in naphtha oil is a bicyclic monomer containing a benzene ring to which is bound a cyclic side chain. The rate of formation of an indene-maleic anhydride copolymer is reported in J. Macromol. Sci., A Vol. 12, No. 8 (1978) but no review is made of an industrial process for producing such copolymer. U.S. Pat. Nos. 4,117,218 and 4,082,820 disclose processes for producing high-softening point resins from maleic anhydride and other monomers including indene and styrene. But these patents do not review the use of various dispersants produced by the disclosed processes.

Coal-derived naphtha oil which accompanies the dry distillation of coal, and petroleum-derived naphtha oil which is produced by thermal cracking of oils are both neutral oils having boiling points in the range of 80°-220° C. In these naphtha oils, indene-based aromatic hydrocarbon oils having reactive double bonds are contained in the form of a mixture, and no industrial process including separation and purification steps has been disclosed with respect to the production of copolymers from this mixture and maleic anhydride.

Japanese Patent Public Disclosure No. 60-206808 describes a process for producing a styrene-maleic anhydride copolymer using a ketone-based solvent. This process has the advantage of permitting consistent operations since the resulting copolymer will not adhere to the walls of the container or the agitating blades. Furthermore, this process allows the copolymer to be produced in high yield. However, because of the extremely high solubility of the copolymer in the solvent used, cumbersome procedures are necessary to separate and recover the copolymer, such as by charging the reaction solution into a poor solvent (i.e., a solvent in which the copolymer is slightly soluble) and recovering the copolymer as a precipitate.

Japanese Patent Publication No. 62-3165 describes a process in which a styrene containing a substituted alkyl-α-methylstyrene is reacted with maleic acid or derivatives thereof in the absence of a solvent to prepare a styrene-maleic acid copolymer. This method, however, is not suitable for industrial operations since the copolymer produced by solventless reaction adheres to the reaction vessel and agitating blades and is difficult to recover.

As described above, the thrust of the prior art is directed to the reactivity of copolymers in an attempt to produce them in high yield. No extensive reviews including efficient separation and recovery of copolymers have been made. Furthermore, copolymers of maleic anhydride and monomers having a reactive double bond are not simple in nature and the reactivity of monomers as well as the solubility of the resulting copolymers will vary depending upon whether the monomer is styrene, olefins having 3-8 carbon atoms or dienes. It is, hence, necessary to design an industrial production process that takes the characteristics of different monomers into account.

A copolymer of maleic anhydride and indene that have reactive double bonds are described in J. Macromol. Sci., A Vol. 12, No. 8 (1978) but the discussion is limited to the kinetics of reaction between indene and maleic anhydride and no review is made of an industrially advantageous process adapted for naphtha oil which contains in a mixture form indene and other polymerizable components having a reactive double bond.

Coke production from coal yields various useful components as by-products, among which is naphtha oil which is obtained as fractions over the boiling point range of 80°–220° C. No efforts have been made to develop new uses of this naphtha oil except for producing indene-coumarone resins in the presence of acid catalysts. The present inventors, therefore, conducted a study on the reaction between maleic anhydride and indene which represents a major percentage of the components in naphtha oil having a reactive double bond, or other components in naphtha oil having a reactive double bond or analogs thereof. As a result, it was found that the desired copolymers could be obtained in high yield from a homogeneous polymerization system but that in order to produce them on an industrial scale, the step of separating the resulting copolymer from the homogeneous solution was needed. A solventless polymerization system (bulk polymerization) has the advantage of obviating the need to separate the copolymer from a solvent but this approach also is not industrially advantageous since the copolymer produced adheres to the reaction vessel or agitating blades and is difficult to recover.

A styrene-maleic anhydride copolymer has recently attracted attention as a heat-resistant resin and it is known that the heat resistance of various resins such as ABS resins, polycarbonate resins (PC resins), polyvinyl chloride resins (PVC resins), polystyrene resins and nylons can be improved by incorporation of this copolymer. Detailed reviews have been made in Soc. Plast. Eng. Annu. Tech. Conf., vol. 45, No. 45, pp. 1384–1387 (1987) and J. Appl. Poly. Sci., vol. 32, No. 8, pp. 6131–6149 (1986). Plastics, vol. 35, No. 9, pp. 49–53 (1984) makes a similar review which states that a styrene-maleic anhydride copolymer starts to decompose thermally at a temperature around 200° C., and that it is difficult to use this copolymer as a resin modifier.

As described above, the styrene-maleic anhydride copolymer starts to decompose thermally at a temperature around 200° C., so it is not suitable for molding by extrusion or injection at temperatures exceeding 200° C. because of various unwanted phenomena that would be encountered such as weight decrease due to the cleavage of the backbone chain of the copolymer or side chains, undesirable coloring and gasification of low-boiling point components. Thus, in spite of its superior performance that makes it potentially suitable for use as a resin modifier that is added to improve the resistance of general-purpose plastics or in the making of a heat-resistance improving resin composition, the styrene-maleic anhydride copolymer has not been used in practice.

Geothermal, oil and natural gas development wells are now commonly drilled by rotary drilling. In the rotary drilling method, a drilling fluid, usually called mud, is pumped down the drill pipe through nozzles in the drilling bit to remove formation cuttings from beneath the bit. The mud also reduces the heat of friction generated by the bit and prevents refracturing of the drill cuttings. As it circulates to the well head by ascending between the drill pipe and the walls of the hole, it transports the cuttings to the surface. In addition, the hydrostatic pressure of the mud column in the hole balances the formation pressure to prevent collapse of weak formations and influx of formation fluids into the well bore.

The mud which plays these important roles in rotary drilling is usually prepared by conditioning a suspension of water and clay with various additives. Clay is typically bentonite which is a montmorillonite-containing clay mineral or sepiolite which is a fibrous magnesium silicate. Commonly employed mud conditioners include sodium lignosulfonate, ferrochrome lignosulfonate, sodium humate, sodium salt of chrome humate and a lignin-humic acid complex. However, the mud prepared with these conventional conditioners does not have high heat resistance so that if it is used in drilling a hole in hot and high-pressure formations, it experiences increased dehydration and gels to form thick mud cakes on the walls of the hole, which might be a cause of drill pipe sticking to the hole. In addition, the recent environmental considerations require that muds containing large amounts of heavy metals be disposed of in an environmentally safe manner, and this substantially precludes the use of ferrochrome lignosulfonate and chrome humate which are comparatively more heat-resistant than other lignosulfonates and humates.

Japanese Patent Publication NO. 53-35875 proposes that a heat-resistant mud suitable for use in drilling a hole in hot formations be prepared by using a system in which alkali metal salts of humic acids are combined with a complex of natural fossil resin and natural asbestos. The mud prepared by this method is capable of withstanding a maximum of 180° C. but at higher temperatures, it deteriorates gradually and becomes completely useless at 220° C. Japanese Patent Publication No. 57-36306 proposes that the heat resistance of a drilling fluid composed of a clay mineral, an alkali salt of nitrohumic acids and water be improved by adding a coumarone-indene resin as a stabilizer. Even this mud is heat-stable up to a temperature of only about 220° C.

Under these circumstances, U.S. Pat. Nos. 3,332,872 and 3,764,530 propose that alkali salts of a styrene-maleic anhydride copolymer or alkali salts of polyacrylic acid be used as mud stabilizers. Dispersants based on these polycarboxylates are more heat-resistant than lignosulfonates and humates but they suffer from the disadvantage that a marked increase in gel strength will occur as a result of prolonged use at about 220° C.

In order for cement mixes (e.g. cement pastes, mortars and concretes) to have improved workability, they must exhibit high initial flowability and experience small change in flowability with time. The flowability of cement mixes in known to decrease with time due primarily to the reaction of hydration between cement and water and to physical aggregation of cement particles. Upon mixing the ingredients, hydration between cement and water occurs in cement mixes and as time lapses, physical and chemical aggregation of cement particles proceeds to reduce cement flowability and its workability and finishability will consequently decrease with time. This phenomenon is commonly referred to as "flow reduction" in mortars or "slump loss" in concretes and limits the "open time" of cement mixes. In the case of fresh concretes, slump loss causes various problems such as limited time of transportation, prolonged standby on the installation site and temporary interruptions of transfer by pumping, all these phenomena leading to undesirable effects such as deterioration of quality and low operational efficiency. Slump loss is also deleterious to fabricated concrete products since it limits molding time or causes insufficient centrifugal re-compaction. Therefore, slump loss, or time-dependent decrease in the flowability of cement mixes such as cement pastes, mortars and concretes, is a critical problem to be solved.

Several proposals have so far been made with a view to preventing slump loss in concretes. Japanese Patent Publication No. 51-15856 shows a method in which a concrete admixture selected either from water-soluble salts of sulfonated aromatic compounds or from water-soluble salts of the products of condensation between sulfonated aromatic compounds and formaldehyde is added repeatedly to concrete to maintain its flowability for a prolonged period. This method is effective to some extent but not only is it low in operational efficiency due to cumbersome procedures of addition of the admixture but it is also disadvantageous from an economic viewpoint.

Another method which involves the addition of a retarder such as an oxycarboxylic acid causes reduction in strength or insufficient hardening. Hydration of cement can be retarded by this method but it is very difficult to prevent physical aggregation of cement particles.

Japanese Patent Public Disclosure No. 54-139929 shows a method in which granules of a concrete admixture such as the product of condensation between naphthalenesulfonic acid and formaldehyde are added to concrete and dissolve slowly to prevent slump loss in the concrete. This method in effective to some extent in preventing slump loss but on the other hand, it is difficult to control the rate of dissolution of the admixture and residual admixture granules will reduce the strength and durability of the concrete.

Additives to be used to prevent slump loss in cements are also described in Japanese Patent Public Disclosure No. 59-141445 (the saponification product of a sulfonated styrene-maleic acid copolymer) and Japanese Patent Public Disclosure No. 60-11256 (the saponified product of a styrene-maleic acid copolymer). However, these additives, if used in small amounts, are not very effective in improving the flowability of cement mixes. Besides, they suffer from an economic disadvantage in that they have to be prepared from expensive materials.

As described above, none of the methods so far proposed for preventing slump loss are not completely satisfactory for practical applications. J. Petroleum Technology, p. 95 (1980) reports the use of a sulfonated styrene-maleic anhydride copolymer as a mud stabilizer but alkali salts of sulfonated styrene-maleic anhydride copolymer, if combined with several conditioners, are capable of providing muds that remain stable up to temperatures of about 250° C. (U.S. Pat. No. 3,730,900). However, the need to drill deeper development wells for recovery of oils, geothermal energy and natural gas is expected to increase in the future and the problems to be encountered in deep-well boring will not be completely solved by the currently available mud stabilizers. It therefore remains desirable to develop a mud stabilizer of improved quality.

Copolymers of maleic anhydride and monomers having a reactive double bond, in particular, styrene or aliphatic hydrocarbon olefins having 4-6 carbon atoms may be used as such but more often than not they are put to use after at least part of the carboxylic acid groups is esterified by reaction with alcohols to impart desirable chemical or physical properties such as increase solubility in solvents and miscibility with other resins, although the polarity of carboxylic acid groups is left intact.

Esterification products of copolymers of maleic anhydride with monomers other than styrene have not been well characterized. The esterification of compounds having acid anhydrides generally proceeds until 50% of the carboxylic acid groups is esterified by the ring opening of acid anhydride groups if the compounds are heated together with alcohols with which they are to be esterified. However, the reaction rate is largely dependent on the molecular weight and structure of the compounds to be esterified and those of the lower molecular weight will undergo esterification with relative ease but difficulty is often encountered in esterifying compounds of the higher molecular weight. The reactivity of compounds is further reduced by the presence of large groups such as a benzene ring and a t-butyl group that adjoin the acid anhydride group to cause steric hindrance.

The conditions for esterifying a styrene-maleic anhydride copolymer or copolymers of maleic anhydride and olefins having 4-6 carbon atoms are known for individual cases and they differ from one resin formulation to another. Therefore, copolymers of maleic anhydride with styrene or olefins cannot be dealt with as one group and methods of their esterification must be considered individually.

Naphtha oil obtained from coal or petroleum contains components having reactive double bonds, a major proportion of which is represented by indene. Such indene or other components having reactive double bonds may be reacted with maleic anhydride to produce copolymers in an industrially feasible yield. In order to impart desirable physical and chemical properties to the copolymer while leaving the characteristic features of carboxylic acid groups intact, part of the carboxylic acid groups in the copolymer may be esterified by reaction with alcohols. The improved solubility of this copolymer in solvents or miscibility with other resins will help expand the scope in which it may be used. However, the method of esterifying maleic anhydride copolymers is largely dependent on the molecular weight or structure of the copolymer resin and specific conditions to be employed will differ from one resin to another. In particular, the esterification products of copolymers between maleic anhydride and indene or other components having reactive double bonds in naphtha oil derived from coal and the process for producing them have not been subjected to a serious review.

SUMMARY OF THE INVENTION

An object, therefore, of the present invention is to provide a copolymer from maleic anhydride and various polymerizable compounds in naphtha oil (i.e., indene and other aromatic hydrocarbon monomers having reactive double bonds, and these may hereinafter sometimes referred to simply as "polymerizable components"), which copolymer can be obtained in high yield and recovered in a substantially quantitative amount without using any special solvent and which has a desirable color.

Another object of the present invention is to provide a novel copolymer by making effective use of polymerizable components in naphtha oil.

Still another object of the present invention is to provide a process by which a copolymer between maleic anhydride and indene, an indene-based component having a reactive double bond or a polymerizable component in naphtha oil can be produced in high yield and separated or recovered in an easy way.

A further object of the present invention is to provide a resin modifier that contains as an effective ingredient a copolymer of maleic anhydride with indene or other polymerizable components in naphtha oil and which has the advantages of better heat resistance than resin compositions incorporating a styrene-maleic anhydride copolymer, and sufficiently good miscibility with general-purpose plastics at about 250° C. to ensure molding by extrusion, injection or other techniques without any particular problem.

A still further object of the present invention is to provide a resin composition having said resin modifier incorporated therein.

Another object of the present invention is to provide a mud stabilizer that may be added to muds so that they will remain stable at elevated temperatures irrespective of the type of development wells to be drilled.

Still another object of the present invention is to provide a slump loss reducing plasticizer which, when incorporated in a cement mix, will impart high initial flow while ensuring that the cement mix will not experience substantial loss in flowability over time.

Yet another object of the present invention is to provide an esterified product of a copolymer between maleic anhydride and indene or a component having a reactive double bond in naphtha oil derived from coal or petroleum.

A further object of the present invention is to provide a process for producing said esterified copolymer.

In order to attain these objects, the present invention provides a copolymer of maleic anhydride and one or more of the polymerizable components in naphtha oil a major proportion of which is represented by indene and other aromatic hydrocarbons having reactive double bonds, a resin modifier containing such copolymer as an effective ingredient, a dispersant containing a salt of the sulfonation product of said copolymer, an esterified product of said copolymer, and preferred processes for producing these products.

DETAILED DESCRIPTION OF THE INVENTION

Naphtha oil is a neutral oil produced from coal or petroleum that has a boiling point in the range of from 80° to 220° C. The principal components of naphtha oil include those which have no reactive double bond such as benzene, toluene, xylenes, trimethylbenzenes, ethyltoluenes, indan, tetramethylbenzenes, methylindans, propylbenzenes and naphthalenes, as well as those which have a reactive double bond as specifically exemplified by styrene, α-methylstyrenes, methylstyrenes, dimethylstyrense, trimethylstyrenes, indene, methylindenes, dicyclopentadiene, coumarone, etc. Naphtha oil also contains minor amounts of acidic substances, basic (nitrogenous) substances and sulfur-containing substances.

The term "polymerizable components" as used hereinabove refers to the mixtures that are chiefly composed of indene and aromatic hydrocarbonoils having a reactive double bond and which are present in naphtha oil.

The composition of naphtha oil may vary with the method of distillation and the type starting materials used and the sum of the polymerizable components, i.e., indene and aromatic hydrocarbonoils having a reactive double bond is about 5–80 wt % on average. The contents of polymerizable components can be increased up to 100% by super-distillation but this is not highly desirable from an operational or economic viewpoint.

The higher the contents of polymerizable components present in starting naphtha oil, the easier the manufacture of the copolymer to be used in the present invention. From a reaction viewpoint, it suffices for the purpose of the present invention that the polymerizable components are present in an amount of at least 5 wt % in naphtha oil. Indene preferably represents at least 50 wt % of the polymerizable components.

The polymerizable components of naphtha oil are chiefly composed of indene and other aromatic hydrocarbonoils having a reactive double bond. As shown below, the polymerizable components in naphtha oil which are chiefly composed of indene and which are present in an amount of at least 5 wt % consist of the following components (a), (b) and (c) whose contents are indicated by weight percentages:

(a) 70–99 wt % of indene;
(b) 0.5–29.5 wt % of styrene; and
(c) 0.5–29.5 wt % in total of one or more compounds selected from among α-methylstyrene, methylstyrene, methylindene, dimethylstyrene, trimethylstyrene, coumarone and dicyclopentadiene.

The sum of (a), (b) and (c) is substantially (a)+(b)+(c)=100 wt %.

(1) According to its first aspect, the present invention provides a copolymer of maleic anhydride and the polymerizable components in naphtha which, as described above, are chiefly composed of indene and other aromatic hydrocarbons having a reactive double bond.

This copolymer may be produced by subjecting the polymerizable components in naphtha oil and maleic anhydride to radical polymerization reaction. The composition of the copolymer will vary depending upon the constitution of the aromatic hydrocarbonoils in naphtha oil which have a reactive double bond. As example of the copolymers that may be used in the present invention is a copolymer between maleic anhydride and aromatic hydrocarbon oils that have the compositional ranges (a)–(c) shown two paragraphs ago in the list of components of naphtha oil.

The resulting copolymer of the polymerizable components in naphtha oil and maleic anhydride is a white powder having a number average molecular weight (Mn) of 1,200–60,000, preferably 1,200–35,000. As in the case of the copolymer of styrene and maleic anhydride, this copolymer, either per se or in the form of an ester or amide of the acid anhydride group or in the form of the product of hydrolysis with an alkali hydroxide or ammonia, may be used extensively as a fluidizing agent, a dispersant for dyes or pigments, an adhesive, a paper size, etc.

Styrene to be used as a starting material is expensive since it is manufactured by dehydrogenation reaction of ethylbenzene on an industrial scale. Considering this fact, the copolymer of the polymerizable components in naphtha oil and maleic anhydride is an industrially attractive product. (2) The second aspect of the present invention lies in a process for producing the above-described copolymer by radical polymerization reaction between maleic anhydride and polymerizable components in naphtha oil that are chiefly composed of indene and aromatic hydrocarbons having a reactive double bond.

Polymerizable components selectively concentrated from naphtha oil may be subjected to copolymerization reaction with maleic anhydride. It is, however, more preferred to use the naphtha oil as such since not only can the step of concentrating polymerizable components in naphtha oil be eliminated but also hydrocarbons in naphtha oil that are not included within the scope of "polymerizable components" can be used as solvents for radical polymerization reaction.

In preparing the copolymer by radical reaction of the polymerizable components in naphtha oil with maleic anhydride, alternating copolymerization reaction may be utilized in the temperature range of 0°–180° C. with a radical reaction initiator added or with the aid of hot radicals generated by the reaction temperature.

However, if naphtha oil containing polymerizable components in an amount of at least 5 wt % and maleic anhydride are totally charged into the polymerizer before the radical reaction is started by addition of a radical reaction initiator or with the aid of hot radicals generated by the reaction temperature, an industrially suitable method is not attained since the heat of reaction presents considerable difficulty in controlling the temperature in the polymerizer. It is therefore preferred to add either one or both of naphtha oil and maleic anhydride into the polymerizer at such rates that the reaction temperature can be controlled at a suitable level.

It is essential that radicals be generated by a suitable method in radical polymerization reaction. This may be done by adding a radical reaction initiator or by inducing hot radicals through elevation of the reaction temperature. However, the latter method is not preferred in the case of preparing the copolymer of the polymerizable components in naphtha oil with maleic anhydride because a high temperature of at least 130° C. is necessary to generate hot radicals and because the hot radicals generated may cause coloration of the resulting copolymer. It is thus recommended that a radical reaction initiator be employed to generate radicals.

The radical reaction initiator to be used may be either an azo-based radical reaction initiator or a peroxide based radical initiator. It is recommended to select such radical reaction initiators that radicals will work effectively in the temperature range of 50°–130° C., or stated more specifically, that the half life at the reaction temperature ranges from 0.1 to 10 h. Preferably, azobisisobutyronitrile, azobiscyclohexanecarbonitrile, benzoyl peroxide, dicumyl peroxide, Perbutyl I (product of Nippon Oil & Fats Co., Ltd.), Perbutyl Z (product of Nippon Oil & Fats Co., Ltd.), etc. are used. If naphtha oil is used as one of the starting materials for copolymerization, the use of azo-based initiators is preferred since peroxide-based initiators may sometimes cause lower yields on account of the trace components in naphtha oil.

The radical reaction initiator may be used in an amount ranging from 0.05 to 5 mol % of the total number of moles of the polymerizable components in naphtha oil and maleic anhydride.

The reaction temperature suffices to be at least 0° C. for allowing the reaction to proceed at a noticeable rate but in order to ensure industrial production, reaction temperatures of at least 50° C. are necessary. If the reaction temperature exceeds 130° C., thermally generated radicals will permit the reaction to proceed in the absence of a radical initiator but then undesirable coloring will take place on account of such factors as impurities. This tendency becomes pronounced if the reaction temperature exceeds 150° C. Therefore, the reaction is preferably carried out at temperatures not exceeding 130° C. in the presence of a radical initiator.

Charging the starting materials, radical reaction initiator and reaction solvent into the polymerizer at one time is not recommendable since the reaction will start at once, making it difficult to control the heat of reaction. To avoid this problem, the polymerizer is charged with either one of indene (or naphtha oil) and maleic anhydride together with a reaction solvent and then the other component is added either separately from or together with an initiator at such rates that the reaction temperature can be effectively controlled.

Alternatively, only the solvent may be charged into the polymerizer before the reaction is started and then additional feeds, i.e., indene (or naphtha oil), maleic anhydride and the radical reaction initiator, are charged into the polymerizer either separately or in appropriate combinations or altogether by a suitable method such as pumping at such rates that the reaction temperature can be effectively controlled. It should be noted here that being solid, maleic anhydride must be charged into the polymerizer after it is dissolved in the reaction solvent. If solid radical reaction initiators are to be used, they are preferably charged after being mixed with the starting oil and the maleic anhydride containing solution or with a mixture of the starting oil and maleic anhydride. If appropriate, the initiator may be diluted with the reaction solvent before it is charged into the polymerizer.

The period of time over which the individual feeds are charged into the polymerizer may be such that the reaction temperature can be controlled in a proper way and the range of from about 0.15 to about 3 h will generally suffice.

The reaction time will vary with such factors as the concentrations of the starting materials, the concentration of the radical reaction initiator and the reaction time but it is generally in the range of from about 1 to about 8 h.

Being a radical polymerization, the reaction to be performed in the present invention is susceptible to the oxygen (dissolved oxygen) present in the reaction system and difficulty may be encountered in controlling important parameters such as the yield of copolymer and its average molecular weight (Mn). To avoid this problem, the dissolved oxygen must be removed either by replacing the reaction atmosphere with an inert gas such as nitrogen or argon or by performing the reaction at the reflux temperature of the reaction solvent. A composition whose molar ratio of polymerizable component of naphtha oil to maleic anhydride is basically about 1:1. A molar ratio (polymerizable component of naptha oil/maleic anhydride) in the range of more than 60/40 to less than 40/60 is also preferable. If the molar ratio exceeds 1.5 (=60/40), homologous polymerized portions of polymerizable components of naphtha oil are produced because polymerizable component of naphtha oil and maleic anhydride cannot be polymerized alternately. Such homologous polymerized portions lower a good heat property of a copolymer comprising polymerizable component of naphtha oil and maleic anhydride. If the molar ratio is below 0.67

(+40/60), the resin yield is reduced. That is because excess maleic anhydride remains unreacted.

The copolymer which gradually forms in the polymerizer from maleic anhydride and a polymerizable component in naphtha oil such as indene is a white solid mass in the range of reaction temperatures. If it dissolves in unreacted monomers, a viscous solution or slurry will form, making it difficult to effect agitation with a stirrer or agitating blades for ensuring constant progress of the reaction. In fact, however, naphtha oil used as one of the starting materials for the reaction contemplated by the present invention contains solvents such as benzene, toluene, xylenes, propylbenzenes, trimethylbenzenes, tetramethylbenzenes, indan, methylindans, etc. and these solvents resulting to ensure not only constant progress of the reaction but also ease in agitating operations and recovery of the copolymer product from the polymerizer. However, if the naphtha oil contains these solvents in small amounts (i.e., polymerizable components are present in large amounts), part of the copolymer will form a slurry and in order to avoid this problem, auxiliary solvents must be added to dilute the reaction system.

The solvent that may be used in the reaction under consideration must satisfy the condition that it does not react chemically with maleic anhydride, have the ability to dissolve maleic anhydride, and dissolve the product copolymer to prevent from deteriorating it. Suitable solvents that satisfy these conditions include preferably: aromatic hydrocarbons such as benzene, toluene, xylenes, trimethylbenzenes, tetramethylbenzenes, indan, methylindan (these being solvent components in naphtha oil other than the polymerizable components), ethylbenzene and propylbenzene; and components other than those present in naphtha oil such as ketones (e.g. acetone, methyl ethyl ketone, methyl propyl ketone, methyl isobutyl ketone, and cyclohexanone), halogenated alkyls (e.g. 1,2-dichloroethane), and ethers (e.g. ethyl ether, dioxane, anisole and tetrahydrofuran).

One of the major advantages that result from employing a solution is that since the copolymer of polymerizable components in naphtha oil and maleic anhydride is in the form of a slurry or a solution, it can be readily recovered from the polymerizer after completion of the reaction, with the added advantage of convenience in cleaning the polymerizer. A more important reason is that the reaction temperature can be controlled without employing any complicated means. The heat of reaction generated by polymerization can be readily removed by first evaporating the reaction solvent utilizing the difference in boiling point and then refluxing the vapor through an appropriate heat exchanger such as a condenser that uses a suitable cooling method such as water cooling.

The reaction vessel (polymerizer) to be employed may be made of any material such as glass or stainless steel that will do no harm to the intended reaction. Using soft steel as the constituent material of the polymerizer is dangerous because if part of the inner wall surface is corroded by some reason such as aerial oxidation, radical decomposition will be accelerated in that area to cause uncontrollable rapid progress of the reaction. Particular care must be exercised when a peroxide-based initiator is used because the abnormal decomposition reaction will proceed rapidly in the corroded area.

The method of preparing the copolymer for use in the present invention is outlined below although a more detailed description will be found in the Examples given later in this specification. A glass polymerizer, or a polymerizer in which the part that is to contact the reaction solution is coated with glass, or a stainless steel polymerizer, which are equipped with a stirrer, an external heater and condenser is charged with maleic anhydride dissolved in a solvent, which is held at the reflux temperature so that dissolved oxygen in the solution is removed by degasing. Oxygen captures radicals and must be removed by nitrogen purging or some other suitable method in ordinary radical reaction. In the method employed in the present invention, oxygen can be removed by merely holding the reaction system at the reflux temperature.

Regardless of the mode of reaction to be adopted, removal of dissolved oxygen from the reaction system is the necessary step for preparing the copolymer of polymerizable components in naphtha oil and maleic anhydride.

After dissolved oxygen is removed, naphtha oil is gradually charged into the polymerizer through an overhead inlet by a suitable method such as pumping or dripping. The naphtha oil to be added may be diluted with one or more of the inert solvents already described.

The radical reaction initiator may be added together with the naphtha oil charge (in this case, the initiator is dissolved preliminarily in the naphtha oil) or alternatively, the initiator may be added gradually through an inlet that is separate from the inlet for the naphtha oil. If the radical reaction initiator is in the solid state, it must be dissolved in one or more of the solvents already described. If this method is to be adopted, it is important for effective working of the radical polymerization initiator that the addition of naphtha oil and this initiator be completed at substantially the same time by performing synchronous charging.

There are various modes of reaction that can be adopted in the present invention. In one method, naphtha oil either independently or as a dilution thereof with a suitable solvent is preliminarily charged into the polymerizer, and thereafter, a solution of maleic anhydride is charged into the polymerizer, either together with or separately from the radical reaction initiator by a suitable method such as pumping or dripping. According to another method, only a solvent is charged into the polymerizer before the reaction s started, and after heating to the reflux temperature, three additional feeds, naphtha oil, maleic anhydride and the radical reaction initiator, are charged into the polymerizer either altogether or in appropriate combinations by a suitable method such as pumping or dripping. It should be noted here that being solid, maleic anhydride must be charged into the polymerizer after it is dissolved in an appropriate amount of one or more of the solvents described above.

Even in the case where maleic anhydride is to be charged together with naphtha oil in which it is dissolved, a suitable amount of solvent may advantageously be used as a diluent since naphtha oil alone is insufficient to make a complete solution of maleic anhydride.

Polymerization reaction is performed by either one of the methods described above to make the copolymer of polymerizable components in naphtha oil with maleic anhydride.

During the addition of the starting materials, the heat of reaction is generated and the reaction in the polymerizer will undergo more violent refluxing in the condenser than before the charging of the starting materials is started. This phenomenon becomes more violent as the starting materials are added at an increased rate. Therefore, the reaction must be controlled in order to prevent bumping, and in terms of the rate of addition, 0.5-5 h will be necessary.

After completion of their addition, the respective components must be held at the same temperature as that maintained during their addition and generally speaking, the period 0.5-2 times as long as the duration of addition is sufficient to bring the reaction to substantial completion.

A copolymer of naphtha oil and maleic anhydride is obtained by performing radical polymerization reaction in the manner described above. This copolymer is present as a solute in the reaction solvent and the solvent components of naphtha oil, so it must be subjected to a post treatment to be recovered as a solid mass.

One possible method of recovery is by distilling off the solvents with the pressure in the polymerizer being reduced to a subatmospheric level. By distilling off the solvents, it is certainly possible to obtain the desired copolymer of polymerizable components and maleic anhydride in the polymerizer but this method is not suitable for use in practical operations since the copolymer sticks to the inner surface of the polymerizer and is difficult to recover. A more common method for recovering a resin dissolved in a solvent is by charging a poor solvent (i.e., a solvent that has only small ability to dissolve the resin) so as to precipitate the resin. Commonly employed poor solvents are alcohols such as methanol and isopropanol but if the reaction solution obtained by the method of the present invention is charged into an alcohol, the sites of acid anhydride groups in the copolymer of polymerizable components in naphtha oil and maleic anhydride will undergo esterification reaction with the alcohol to form ester bonds, which are not desirable for the purposes of the present invention. In order to find more appropriate poor solvents, the present inventors conducted intensive studies and discovered that hydrocarbons such as n-hexane and decane, naphthenic hydrocarbons such as cyclohexane, industrial gasolines such as ligroin and mixtures of these solvents were suitable.

If the reaction solution containing the copolymer of polymerizable components in naphtha oil and maleic anhydride is charged into one or more of these poor solvents, the copolymer precipitates can be recovered in a substantially quantitative amount. Using the poor solvents in amounts that range from 0.5 to 5 times the volume of the copolymer will suffice for the purposes of the present invention. When the solution of the copolymer of maleic anhydride and polymerizable components in naphtha oil is charged into one or more of the poor solvents described above, a white precipitate of the intended copolymer will form. This precipitate can be easily separated and recovered in a substantially quantitative amount by filtration and other suitable operations such as centrifugal desolvation/separation. By subsequent vacuum drying, the copolymer of polymerizable components in naphtha oil and maleic anhydride can be obtained as a white powder.

The yield of the copolymer of polymerizable components in naphtha oil and maleic anhydride may be calculated by the following equation (1):

$$\text{Copolymer yield (\%)} = \frac{\text{weight (g) of the copolymer of polymerizable components in naphtha oil and maleic anhydride}}{\text{polymerizable components (g) in naphtha oil + maleic anhydride (g)}} \times 100 \quad (1)$$

The copolymer obtained was analyzed by infrared (IR) absorption spectroscopy, nuclear magnetic resonance (NMR) spectroscopy and gel permeation chromatography (GPC). (3) According to the third aspect of the present invention, there is provided a process for producing a copolymer of maleic anhydride and an indene-based compound having a reactive double bond by performing radical polymerization reaction between maleic anhydride and indene or naphtha oil that is chiefly composed of aromatic hydrocarbons having a reactive double bond. In this process, a solvent that dissolves such naphtha oil and maleic anhydride but which has only small ability to dissolve the resulting copolymer is used as a reaction solvent and no special solvent is used to recover the precipitating copolymer.

The reaction solvent to be used must be a good solvent for the starting materials, i.e., indene or naphtha oil and maleic anhydride, while at the same time, it should be inert to these starting materials. If the solvent selected has such a great ability to dissolve the copolymer formed in the reaction system, the latter may form a viscous slurry or stick to the walls of the reaction vessel or agitating blades, thereby making it difficult to perform efficient agitation. Therefore, an appropriate reaction solvent is such that it has a small ability to dissolve the resulting copolymer; as a guide, the solubility of the copolymer in the solvent at ordinary temperatures is preferably no more than 0.5 g per 100 ml of the solvent. Any solvents that satisfy these conditions may be used without problem and specific examples include halogenated hydrocarbons such as carbon tetrachloride and chloroform, as well as benzene, toluene, ethylbenzene, xylene, cumene, cymene, indan, and alkyl- or dialkyldiphenyls. If the copolymer is to be produced at low cost on an industrial scale, benzene, toluene, ethylbenzene, xylene and cumene are preferred.

The reaction solvent may appropriately be used in the present invention in amounts ranging from 300 to 2,000 ml per mole of the sum of maleic anhydride and indene or an aromatic hydrocarbon component having a reactive double bond in naphtha oil. If the amount of reaction solvent used is less than 300 ml, the volume of the resulting copolymer will exceed the amount of the solvent and increased resistance to agitation will develop although there is no problem of sticking to the walls of the polymerizer or agitating blades. If the amount of reaction solvent exceeds 2,000 ml, the amounts of starting materials that can be charged into the polymerizer are reduced to cause an undesirable decrease in the efficiency of copolymer production.

For the other requirements or conditions that should be fulfilled to produce the copolymer in high yield, see the description made in connection with the second aspect of the present invention.

By adopting the appropriate conditions described above, the intended copolymer of the present invention will separate as white fine particles from the reaction system without sticking to the walls of the polymerizer or agitating blades, which would otherwise occur as a result of continued reaction. After the reaction is completed, the copolymer can be separated by a simple operation such as filtration.

The process according to the third aspect of the present invention is to be chiefly applied to the production of a copolymer by radical polymerization reaction between naphtha oil and maleic anhydride. It should, however, be noted that indene rather than naphtha oil may be copolymerized with maleic anhydride using a reaction solvent that satisfies the conditions described above. The indene to be used is not limited to the one that is obtained from naphtha oil. (4) According to the fourth aspect of the present invention, there is provided a resin modifier that contains as an effective ingredient the copolymer of maleic anhydride and indene or a polymerizable component in naphtha oil that is chiefly composed of an aromatic hydrocarbon having a reactive double bond. The naphtha oil to be used, the copolymer of maleic anhydride and a polymerizable component in naphtha oil, and the advantageous process for producing said copolymer were already described in detail on the foregoing pages.

The copolymer may be immediately used as a resin modifier but more preferably, it is used either as a solution in a solvent such as methyl ethyl keton or methyl isobutyl ketone, or as a powder having an average particle size of 10–1,000 μm.

The fourth aspect of the present invention is primarily directed to a resin composition that contains as an effective ingredient the copolymer of maleic anhydride and a polymerizable component in naphtha oil. It should, however, be noted that a similarly effective resin modifier can be produced using indene per se instead of naphtha oil. The indene to be used is in no way limited to the one obtained from naphtha oil.

In order to evaluate the heat-resisting properties of the copolymer prepared from indene or naphtha oil and maleic anhydride, it was heated to varying temperatures and was found to experience no weight loss up to a temperature of about 300° C. Even when it was placed in a nitrogen gas atmosphere for a prolonged period at a temperature of about 250° C. which is commonly employed to perform mixing with general-purpose plastics, the copolymer experienced no change in its weight and molecular weight. This is because indene, whether it is to be used independently or as a principal polymerizable component in naphtha oil, has a bicyclic structure and is more thermally stable than heretofore used styrene. Hence, as the content of indene in the polymerizable components of naphtha oil increases, so does the heat resistance of the copolymer prepared from maleic anhydride and the polymerizable components in naphtha oil. In ordinary naphtha oil, at least 50 wt % of the polymerizable components is represented by indene and even a copolymer prepared from such ordinary naphtha oil and maleic anhydride will have better heat stability than the conventional styrene-maleic anhydride copolymer and may be mixed with general-purpose plastics to improve their heat resistance. No problem will occur even if the mix is shaped by a common molding method.

The copolymer described above may be incorporated in the usual manner in a thermoplastic resin such as ABS resin, PC resin, PVC resin, polystyrene resin or nylon, which may be used either independently or as admixtures. The proportion of the resin taken by the copolymer is not limited but preferably 1–20 parts by weight of the copolymer is incorporated in 100 parts by weight of the resin. The two components are mixed at a temperature of about 250° C. by a suitable means such as a single- or twin-screw kneader and subsequently shaped by a usual method such as extrusion or injection to produce a desired heat-resistant resin composition.

To the resin composition of the present invention, suitable additives such as fillers, admixtures, antioxidants, etc. may be added as required. (5) According to the fifth aspect of the present invention, there is provided a dispersant that contains as an effective ingredient at least one member selected from the group consisting of an alkali metal salt, an alkaline earth metal salt, an ammonium salt and an amine salt of the sulfonation product of a copolymer between maleic anhydride and indene or polymerizable components in naphtha oil a major proportion of which is represented by aromatic hydrocarbons having a reactive double bond. As will be described below, this dispersant may be effectively used as a mud stabilizer or as a slump loss reducing plasticizer.

The naphtha oil to be used, the components of the preferably used naphtha oil, the copolymer of maleic anhydride and a polymerizable component in naphtha oil, and the advantageous process for producing said copolymer were already described in detail on the foregoing pages.

The fifth aspect of the present invention is principally directed to a dispersant that contains as an effective ingredient the copolymer of maleic anhydride and a polymerizable component in naphtha oil. It should, however, be noted that instead of naphtha oil, a bicyclic aromatic compound having a polymerizable double bond of 8–10 carbon atoms either in the presence or absence of a substituent may be employed in a similar manner. Typical examples of such bicyclic aromatic compound include indene, methylindene and coumarone, with indene being particularly preferred. Mixtures of these compounds may also be used.

If the copolymer is to be used as an active ingredient of mud stabilizer, it preferably has a number average molecular weight in the range of 1,000–30,000. In a preferred embodiment, the copolymer is sulfonated with an appropriate sulfonating agent such as sulfuric acid or fuming sulfuric acid and the residual unreacted sulfuric acid is removed as gypsum by liming sodation, with the sulfonated copolymer being converted to a sodium salt form.

If the dispersant described above is used as a mud stabilizer, geothermal, oil or natural development wells can be efficiently made by drilling or boring through hot formations. A preferred formulation of mud stabilizer that is particularly suitable for drilling through hot formations consists of the dispersant, a clay mineral and water. A specific example of mud stabilizer intended to be used in drilling various types of development wells may be prepared by the following mud conditioning process: to a suspension of 2–6 parts of bentonite in 100 parts of fresh water, 0.1–5 parts of an alkali salt of the copolymer is added, and if necessary, 1–3 parts of an additional component such as a metal salt of lignosulfonic acid, a metal salt of humic acids, or Telnite BH, Lignate or BM-Nite (the last three are high-temperature mud stabilizers available from Telnite Co., Ltd.) may also be employed.

Special polymer-base muds consist of (1) bentonite or sepiolite as a basic colloidal agent, (2) chrysotile-containing asbestos working both as a thickening agent and as an agent for improving the mud's ability to transport drill cuttings, (3) Telnite BH as an agent for providing stability at high temperatures, suppressing dehydration (water loss) and stabilizing weak formations, (4) a high-temperature dispersion stabilizer, and (5) sodium hydroxide as a pH control agent. Conventionally, sodium polyacrylate, sodium polyacrylate ester or sulfomethylated tannin has been used as high-temperature dispersion stabilizer (4). If the alkali salt of the copolymer prepared in accordance with the present invention is used instead of these conventional high temperature dispersion stabilizers, drilling muds can be obtained that will experience smaller increases in viscosity and yield value upon standing for a prolonged period and which exhibit satisfactorily performance up to temperatures of about 270° C. even in the presence of drilled solids, to say nothing of the case where they are absent.

The slump loss reducing fluidizing agent of the present invention is used as an alkali metal, alkaline earth metal, ammonium or amine salt of the copolymer. Two or more of these salts may be used as admixtures. The acid anhydride groups in the copolymer are preferably totally neutralized in these salts but they may partly remain unneutralized.

The copolymer preferably has a number average molecular weight of 1,000-20,000.

The slump loss reducing fluidizing agent of the present invention may be prepared by any suitable method, but a preferred method comprises the following steps: reacting indene with maleic anhydride under conditions of radical polymerization in the presence or absence of a radical initiator to form a copolymer of indene and maleic anhydride; sulfonating the copolymer with a sulfonating agent such as sulfuric acid or fuming sulfuric acid; removing the residual unreacted sulfuric acid as gypsum by liming sodation so as to produce a sodium salt of the sulfonated copolymer.

The so prepared slump loss reducing fluidizing agent of the present invention is preferably used in an amount of 0.01-1.0 wt % of cement, with the range of 0.1-0.5 wt % being particularly preferred. If less than 0.1 wt % of the fluidizing agent is used, the initial value of slump loss is small. Using more than 0.5 wt % of the fluidizing agent will in no way contribute to improved performance and will simply result in poor economy.

The slump loss reducing fluidizing agent of the present invention may be used in combination with various cement additives such as air entraining agents, air entrainment attenuators, hardening regulators, etc.

(6) According to the sixth aspect of the present invention, there is provided an esterified copolymer of maleic anhydride and indene or polymerizable components in naphtha oil, a major percentage of which is represented by hydrocarbons having a reactive double bond. In this esterified copolymer, at least part of the carboxylic acid groups including acid anhydride groups are esterified.

The naphtha oil to be used, the copolymer of maleic anhydride and a polymerizable component innaphtha oil, and the advantageous process for producing said copolymer were already described in detail on the foregoing pages.

In preparing the esterified copolymer according to the sixth aspect of the present invention, maleic anhydride may be copolymerized with polymerizable components in naphtha oil or with indene per se. The esterified copolymer is such that a part, preferably 5-50%, of those carboxylic acid groups including acid anhydride groups which are present in the copolymer of maleic anhydride and indene or polymerizable components in naphtha oil, a major proportion of which is represented by indene and other aromatic hydrocarbons having a reactive double bond is esterified.

The desired esterified copolymer may be obtained by heating the copolymer of maleic anhydride and indene or a polymerizable component in naphtha oil together with an alcohol. Compared to the original copolymer, the esterified copolymer has improved physical properties such as better solubility in organic solvents and higher miscibility with other resins. There is no particular limitation on the alcohols that may be used to esterify the copolymer. Specific examples of alcohols that can be used include: aliphatic alcohols such as methyl alcohol, ethyl alcohol, propyl alcohol, butyl alcohol, amyl alcohol and hexyl alcohol; cellosolves such as methyl cellosolve, ethyl cellosolve, propyl cellosolve, and butyl cellosolve; lower diols such as ethylene glycol, diethylene glycol and 1,4-butanediol; and alcohols having a functional group such as monochloroethyl alcohol, allyl alcohol, ethanolamine and benzyl alcohol.

The resulting esterified copolymer is a white powder having a number average molecular weight (Mn) of 1,200-35,000 and it can be extensively used as paint or ink additives, dye or pigment dispersants, adhesive aids, leveling agents in floor polishing waxes, etc.

The process for producing the esterified copolymer is briefly described below. The alcohols listed two paragraphs ago are used to esterify the copolymer. The esterification between the copolymer and the alcohol will gradually proceed even if the reaction temperature is low. However, a very long time, sometimes a whole day and longer is needed to attain the desired degree of esterification. Therefore, it is recommended to perform the reaction at a temperature between 100° and 200° C. If the reaction temperature is 100° C. and above, the desired degree of esterification can be reached within about 24 h although the exact time will vary with the type of alcohol used and the degree of esterification to be attained. If alcohols of low reactivity are used or if 30% or more esterification is desired, the reaction temperature of 100° C. is insufficient and needs to be about 160° C. Temperature above 200° C. are not desirable since the decomposition reaction of the esterified copolymer will start at such high temperature.

If the reaction is performed in an air atmosphere, the aerial oxygen might cause undesirable coloring of the esterified product or introduce a fire hazard. It is thus required that the esterification reaction be performed in an inert atmosphere such as nitrogen or argon.

A pressure-resistant reaction vessel must be employed in the esterification reaction since reaction temperature of 100°-200° C. will exceed the boiling points of some alcohols.

Reaction solvents may or may not used. However, some alcohols have such a great ability to dissolve the esterified copolymer that there may be a case where the rate of its recovery (precipitation) cannot be improved any further by charging it into a poor solvent. In this case, the use of reaction solvents is desirably avoided.

The degree of esterification can be calculated from the instrumental integration for the ester as obtained by proton NMR.

EXAMPLES

The following examples are provided for the purpose of further illustrating the present invention but are in no way to be taken as limiting.

EXAMPLE 1

A glass polymerizer (inner capacity, 500 ml) equipped with a stirrer, a dropping funnel and a reflux condenser was charged with 24.5 g (0.25 mol) of maleic anhydride dissolved in 100 ml of methyl ethyl ketone.

Under agitation with the stirrer, the charge was held at the reflux temperature by heating with an external heater. Thereafter, a solution containing 60 g of naphtha oil [with 48% (0.25 mol) of polymerizable components in terms of indene (mol. wt. 116)] and 410 mg of azoisobutyronitrile (AIBN) as a radical polymerization initiator was charged into the overhead dropping funnel and this solution was dripped slowly into the polymerizer over 1 h. After completion of the dripping, the reaction solution was left under reflux for 2 h until the reaction was completed. The reaction solution was thereafter returned to room temperature and gradually added to 300 ml of n-hexane in a precipitating tank (beaker with an inner capacity of 1 L), whereupon a white precipitate of copolymer formed. The precipitate was separated by filtration under suction and vacuum-dried to obtain a copolymer of maleic anhydride and polymerizable components in naphtha oil in a yield of 95 wt % as calculated from equation (1) given hereinabove.

Prior to the experiment of synthesis, the compositional analysis of naphtha oil was performed by gas chromatography (GC) and the result was as follows:

| Nonpolymerizable component | 52 wt % | Composition of polymerizable component | | |
|---|---|---|---|---|
| | | (a) indene | (b) styrene | (c) others |
| Polymerizable component | 48 wt % | 81% | 3% | 16% |

The resulting copolymer had a number average molecular weight of 13,500 (sample No. 1 of the present invention).

EXAMPLE 2

The naphtha oil used in Example 1 was further distilled to obtain the following fractions:

| Nonpolymerizable component | 75 wt % | Composition of polymerizable component | | |
|---|---|---|---|---|
| | | (a) indene | (b) styrene | (c) others |
| Polymerizable component | 25 wt % | 70% | 8% | 22% |

A copolymer was prepared in Example 1 except that 116 g of the naphtha oil having this composition (0.25 mol of the polymerizable component in terms of indene) was used. The resulting copolymer was white in color and its yield was 92 wt %.

This copolymer had a number average molecular weight of 17,500 (sample No. 2 of the present invention).

EXAMPLE 3

The naphtha oil used in Example 1 was further distilled to obtain the following fractions:

| Nonpolymerizable component | 10 wt % | Composition of polymerizable component | | |
|---|---|---|---|---|
| | | (a) indene | (b) styrene | (c) others |
| Polymerizable component | 90 wt % | 95% | 2% | 3% |

A copolymer was prepared as in Example 1 except that 32 g of the naphtha oil having this composition (0.25 mol of the polymerizable component in terms of indene) was used and that the naphtha oil was diluted with 100 ml of methyl isobutyl ketone in order to avoid precipitation of the copolymer during reaction on account of the high content of polymerizable components. The resulting copolymer was white in color and its yield was 96 wt %.

This copolymer had a number average molecular weight of 6,500 (sample No. 3 of the present invention).

EXAMPLE 4

A glass polymerizer (inner capacity, 500 ml) equipped with a stirrer, a dropping funnel, a reflux condenser and a nitrogen introducing pipe was charged with 200 ml of chloroform as a reaction solvent. Under agitation with the stirrer, a small amount of nitrogen gas was constantly supplied into the polymerizer while at the same time, the solvent in the polymerizer was held at 50° C. by means of an oil bath equipped with a temperature controller. Thereafter, a uniform solution of indene (29 g), maleic anhydride (24.5 g), benzoyl peroxide (1.2 g) and chloroform (100 ml) was charged into the overhead dropping funnel and dripped into the polymerizer slowly over a period of about 1 h.

Fifteen minutes after the start of dripping, the reaction solution started to become turbid and fine particles of copolymer formed. Thereafter, the reaction system was held at the reaction temperature for 5 h until the reaction was completed.

Subsequently, the reaction solution was subjected to filtration by suction to separate the fine particles, which were vacuum-dried to obtain an indene-maleic anhydride copolymer in a yield of 95 wt %.

This copolymer had a number average molecular weight of 30,500 as measured by GPC.

EXAMPLE 5

A glass polymerizer (inner capacity, 1 L) equipped with a stirrer, a dropping funnel and a reflux condenser was charged with 400 ml of benzene (reaction solvent) and 98 g of maleic anhydride. Under agitation with the stirrer, the reaction solution in the polymerizer was held under reflux by means of an oil bath equipped with a temperature controller.

A uniform solution of indene (116 g), Perbutyl I (2 g, product of Nippon Oil & Fats Co., Ltd.) and benzene (200 g) was charged into the overhead dropping funnel and dripped into the polymerizer slowly over a period of about 2 h. Twenty minutes after the start of dripping, the reaction solution started to become turbid.

Thereafter, the reaction system was held at the reflux temperature for about 3 h until the reaction was completed.

After completion of the reaction, the reaction mixture was returned to room temperature and subjected to filtration by suction to separate the resulting fine particles, which were vacuum-dried to obtain an indene-maleic anhydride copolymer in a yield of 93 wt %.

This copolymer had a number average molecular weight of 5,300 as measured by GPC.

EXAMPLE 6

A Stainless steel polymerizer (inner capacity, 2 L) equipped with a stirrer, a feed pump, a reflux condenser and a nitrogen introducing pipe was charged with 1.2 L of toluene and 232 g of indene. Under agitation with the stirrer, a small amount of nitrogen gas was constantly supplied into the polymerizer and the temperature of the reaction solution was held at 90° C. by means of an external heater until the end of the reaction. A tank associated with the feed pump was charged with maleic anhydride (196 g), azoisobutyronitrile (3.3 g) and toluene (0.6 L), from which a uniform solution was formed. This solution was supplied to the polymerizer by the feed pump over a period of 2 h. Thereafter, the contents of the polymerizer were left to stand for about 4 h until the reaction was completed.

Thereafter, the reaction mixture was returned to room temperature and the polymerizer was uncovered. The reaction product did not adhere to the walls of the polymerizer or the agitating blades and instead it formed a flowable creamy mass as a whole.

The resulting fine particles were separated by suction filtration and vacuum-dried to obtain an indene-maleic anhydride copolymer in a yield of 93 wt %.

This copolymer had a number average molecular weight of 1,600 as measured by GPC.

EXAMPLE 7

A glass polymerizer (inner capacity, 1 L) equipped with a stirrer, a dropping funnel, a reflux condenser and a nitrogen introducing pipe was charged with 300 ml of toluene. Under agitation with the stirrer, a small amount of nitrogen gas was constantly supplied into the polymerizer while at the same time, the solvent in the polymerizer was held at 70° C. by means of an oil bath equipped with a temperature controller. A uniform solution of naphtha oil (138 g containing 42 wt % of the polymerizable component), maleic anhydride (49 g), azoisobutyronitrile (0.6 g) and toluene (200 ml) was charged into the dropping funnel and dripped into polymerizer slowly over a period of about 1 h. About 20 min after the start of dripping, the reaction solution started to become turbid.

Thereafter, the contents of the polymerizer were held at the reaction temperature for 5 h until the reaction was completed.

After completion of the reaction, the system was returned to room temperature and the resulting fine particles were separated by suction filtration and vacuum-dried to obtain a copolymer of maleic anhydride and the polymerizable component of naphtha oil in a yield of 93 wt %.

This copolymer had a number average molecular weight of 18,300 as measured by GPC.

EXAMPLE 8

A Stainless steel polymerizer (inner capacity, 2 L) equipped with a stirrer, a feed pump, a reflux condenser and a nitrogen introducing pipe was charged with 800 ml of xylene and 196 g of maleic anhydride. Under agitation with the stirrer, a small amount of nitrogen gas was constantly supplied into the polymerizer and the temperature of the reaction solution was held at 100° C. by means of an external heater until the end of the reaction. A tank associated with the feed pump was charged with naphtha oil (containing 65 wt % of polymerizable component), azoisobutyronitrile (24 g) and xylene (400 ml), from which a uniform solution was formed. This solution was supplied to the polymerizer by the feed pump over a period of 1 h. Thereafter, the contents of the polymerizer were left to stand for about 4 h until the reaction was completed.

Thereafter, the reaction mixture was returned to room temperature and the polymerizer was uncovered. The reaction product did not adhere to the walls of the polymerizer or the agitating blades and instead it formed a flowable creamy mass as a whole.

The resulting fine particles were separated by suction filtration and vacuum-dried to obtain a copolymer of maleic anhydride and the porimerizable component of naphtha oil in a yield of 97 wt %.

This copolymer had a number average molecular weight of 9,600 as measured by GPC.

EXAMPLE 9

A glass polymerizer (inner capacity, 2 L) equipped with a stirrer, a dropping funnel, a reflux condenser and a nitrogen introducing pipe was charged with 500 ml of cumene. Under agitation with the stirrer, a small amount of nitrogen gas was constantly supplied into the polymerizer while at the same time, the solvent in the polymerizer was held at 120° C. by means of an oil bath equipped with a temperature controller. A uniform solution of naphtha oil (305 g containing 38 wt % of the polymerizable component), maleic anhydride (49 g), azoisobutyronitrile (4.0 g) and cumene (200 ml) was charged into the dropping funnel and dripped into polymerizer slowly over a period of about 1 h. About 10 min after the start of dripping, the reaction solution started to become turbid.

Thereafter, the contents of the polymerizer were held at the reaction temperature for 2 h until the reaction was completed.

After completion of the reaction, the system was returned to room temperature and the resulting fine particles were separated by suction filtration and vacuum-dried to obtain a copolymer of maleic anhydride and the polymerizable component of naphtha oil in a yield of 93 wt %.

This copolymer had a number average molecular weight of 3,800 as measured by GPC.

EXAMPLE 10

Prior to the experiment of synthesis, the compositional analysis of naphtha oil was performed by gas chromatography (GC) and the result was as follows:

| Nonpolymerizable component | 52 wt % | Composition of polymerizable component | | |
|---|---|---|---|---|
| | | (a) indene | (b) styrene | (c) others |
| Polymerizable component | 48 wt % | 81% | 3% | 16% |

A Stainless steel polymerizer (inner capacity, 2 L) equipped with a stirrer, a feed pump, a reflux condenser and a nitrogen introducing pipe was charged with 600 ml of ethylbenzene . Under agitation with the stirrer, a small amount of nitrogen gas was constantly supplied into the polymerizer and the temperature of the reaction solution was held at 120° C. by means of an external heater until the end of the reaction. A tank associated with the feed pump was charged with naphtha oil (120 g), maleic anhydride (49 g), azobiscyclohexanecarbonitrile (2.0 g) and ethylbenzene (300 ml), from which a uniform solution was formed. This solution was supplied to the polymerizer by the feed pump over a period of 1 h. Thereafter, the contents of the polymerizer were left to stand for about 3 h until the reaction was completed.

Thereafter, the reaction mixture was returned to room temperature and the polymerizer was uncovered. The reaction product did not adhere to the walls of the polymerizer or the agitating blades and instead it formed a flowable creamy mass as a whole.

The resulting fine particles were separated by suction filtration and vacuum-dried to obtain a copolymer of maleic anhydride and the porimerizable component of naphtha oil in a yield of 93 wt %.

This copolymer had a number average molecular weight of 4,400 as measured by GPC.

EXAMPLE 11

Prior to the experiment of synthesis, the compositional analysis of naphtha oil was performed by gas chromatography (GC) and the result was as follows:

| Nonpolymerizable component | 75 wt % | Composition of polymerizable component | | |
|---|---|---|---|---|
| | | (a) indene | (b) styrene | (c) others |
| Polymerizable component | 25 wt % | 70% | 8% | 22% |

A glass polymerizer (inner capacity, 1 L) equipped with a stirrer, a dropping funnel and a reflux condenser was charged with 300 ml of toluene. Under agitation with the stirrer, the charge in the polymerizer was held at the reflux temperature of the solvent by means of an oil bath equipped with a temperature controller. A uniform solution of naphtha oil (464 g), maleic anhydride (98 g), azoisobutyronitrile (1.6 g) and toluene (100 ml) was charged into the dropping funnel and dripped into polymerizer slowly over a period of about 1 h. About 8 min after the start of dripping, the reaction solution started to become turbid.

Thereafter, the contents of the polymerizer were held at the reaction temperature for 2 h until the reaction was completed.

After completion of the reaction, the system was returned to room temperature and the resulting fine particles were separated by suction filtration and vacuum-dried to obtain a copolymer of maleic anhydride and the polymerizable component of naphtha oil in a yield of 93 wt %.

This copolymer had a number average molecular weight of 7,200 as measured by GPC.

EXAMPLE 12

Prior to the experiment of synthesis, the compositional analysis of naphtha oil was performed by gas chromatography (GC) and the result was as follows:

| Nonpolymerizable component | 10 wt % | Composition of polymerizable component | | |
|---|---|---|---|---|
| | | (a) indene | (b) styrene | (c) others |
| Polymerizable | 90 wt % | 95% | 2% | 3% | component

A Stainless steel polymerizer (inner capacity, 2 L) equipped with a stirrer, a feed pump, a reflux condenser and a nitrogen introducing pipe was charged with 1,000 ml of cumene. Under agitation with the stirrer, a small amount of nitrogen gas was constantly supplied into the polymerizer and the temperature of the reaction solution was held at 120° C. by means of an external heater until the end of the reaction. A tank associated with the feed pump was charged with naphtha oil (130 g), maleic anhydride (98 g), azoisobutyronitrile (5 g) and cumene (500 ml), from which a uniform solution was formed. This solution was supplied to the polymerizer by the feed pump over a period of 2 h. Thereafter, the contents of the polymerizer were left to stand for about 3 h until the reaction was completed.

Thereafter, the reaction mixture was returned to room temperature and the polymerizer was uncovered. The reaction product did not adhere to the walls of the polymerizer or the agitating blades and instead it formed a flowable creamy mass as a whole.

The resulting fine particles were separated by suction filtration and vacuum-dried to obtain a copolymer of maleic anhydride and the polymerizable component of naphtha oil in a yield of 95 wt %.

This copolymer had a number average molecular weight of 3,900 as measured by GPC.

EXAMPLE 13

A glass polymerizer (inner capacity, 500 ml) equipped with a stirrer, two dropping funnels and a reflux condenser was charged with a dilution of indene (27 g, 0.25 mol) in methyl isobutyl ketone (100 ml). Under agitation with the stirrer, the contents of the polymerizer were held at the reflux temperature with an external heater.

One of the two dropping funnels was charged with a solution of maleic anhydride (24.5 g) in methyl isobutyl ketone (100 ml). The other dropping funnel was charged with a dilution of 400 mg of Perbutyl Z (the trade name of Nippon Oil & Fats Co., Ltd. for a peroxide-based radical reaction initiator) in 50 ml of methyl isobutyl ketone. Thereafter, the solutions in the two dropping funnels were started to drip at the same time and dripped slowly into the polymerizer over 1 h. After completion of the dripping, the system was held at the reflux temperature for 1 h until the reaction was completed.

The reaction solution was returned to room temperature and slowly poured into ligroin (300 ml) in a precipitation tank (a glass beaker having an inner capacity of 1 L), whereupon a white precipitate of indene-maleic anhydride copolymer formed. The precipitate was separated by suction filtration and vacuum-dried to obtain an indene-maleic anhydride copolymer in a yield of 96 wt %.

This copolymer had a number average molecular weight of 12,000 as measured by GPC.

EXAMPLE 14

Prior to the experiment of synthesis, the compositional analysis of naphtha oil was performed by gas chromatography (GC) and the result was as follows:

| Nonpolymerizable component | 75 wt % | Composition of polymerizable component | | |
|---|---|---|---|---|
| | | (a) indene | (b) styrene | (c) others |
| Polymerizable component | 25 wt % | 70% | 8% | 22% |

A glass polymerizer (inner capacity, 1 L) equipped with a stirrer, a dropping funnel and a reflux condenser was charged with 300 ml of toluene. Under agitation with the stirrer, the charge in the polymerizer was held at the reflux temperature of the solvent by means of an oil bath equipped with a temperature controller. A uniform solution of naphtha oil (464 g), maleic anhydride (98 g), azoisobutyronitrile (1.6 g) and toluene (100 ml) was charged into the dropping funnel and dripped into polymerizer slowly over a period of about 1 h. About 8 min after the start of dripping, the reaction solution started to become turbid.

Thereafter, the contents of the polymerizer were held at the reaction temperature for 2 h until the reaction was completed.

After completion of the reaction, the system was returned to room temperature and the resulting fine particles were separated by suction filtration and vacuum-dried to obtain a copolymer of maleic anhydride and the polymerizable component of naphtha oil in a yield of 93 wt %.

This copolymer had a number average molecular weight of 7,200 as measured by GPC.

EXAMPLE 15

The profile of weight loss in the copolymer prepared in Example 13 was measured by a thermogravitometer (product of Rigaku Co., Ltd.) in a nitrogen atmosphere with the temperature being elevated from room temperature at a rate of 3° C./min. The weight of the copolymer was found to decrease at 310° C. and above.

COMPARATIVE EXAMPLE 1

The profile of weight loss in a styrene-maleic anhydride copolymer was measured under the same conditions as those employed in Example 15. This copolymer was found to decrease in weight at 280° C. and above.

EXAMPLE 16

The profile of weight loss in the copolymer prepared in Example 7 was measured by a thermogravitometer (product of Rigaku Co., Ltd.) in a nitrogen atmosphere with the temperature held at 270° C. for 3 h. The weight of the copolymer did not decrease at all. GPC showed no change in the molecular weight of the tested copolymer, suggesting that cleavage of the backbone chain and side chains in the copolymer would not proceed at 270° C.

COMPARATIVE EXAMPLE 2

The profile of weight loss in a styrene-maleic anhydride copolymer (commercial product) was measured under the same conditions as those employed in Example 16. At the end of the measurement, the copolymer was found to have experienced a 5% weight loss compared to its initial total weight. Based on this data, one may well conclude that the styrene-maleic anhydride copolymer is not as heat-stable as the copolymer of maleic anhydride and the polymerizable component of naphtha oil.

EXAMPLE 17

Copolymers of maleic anhydride and the polymerizable component in naphtha oil, having molecular weights of 6,000, 8,500 and 18,000 were sulfonated and subsequently subjected to liming sodation to synthesize alkali salts of sulfonated copolymers. Three hundred milliliters each of the alkali salts of sulfonated copolymers (10%) in solution was charged into an autoclave and held at 250° C. for 15 h. Thereafter, the solutions were returned to room temperature and the molecular weights of the copolymers were measured by GPC. Each sample had the same molecular weight as it was before the heat treatment, suggesting that none of the copolymers experienced thermal deterioration.

EXAMPLE 18

Fresh water (100 parts), bentonite (4 parts), chrysotile-containing asbestos (1 part) and an alkali metal salt of humic acids (4 parts) were mixed with one part of a sodium salt of sulfonated copolymers (Mn, 8,500) of maleic anhydride and the polymerizable component in naphtha oil to prepare a drilling mud. The characteristics of this mud were evaluated under the conditions shown in Table 1. Measurements were conducted with a Fann VG meter and a dehydration (water loss) tester that complied with the A.P.I. Standard.

TABLE 1

| Condition | Apparent viscosity (cp) | Plastic viscosity (cp) | Yield value (Lb/100 ft$^2$) | Gel strength (Lb/100 ft$^2$) | Water loss (ml) | PH |
|---|---|---|---|---|---|---|
| R.T. | 9.5 | 8 | 3 | 1–2 | 6.5 | 10.5 |
| 180° C. × 16h | 13 | 11 | 4 | 1–3 | 9.5 | 9.0 |
| 220° C. × 16h | 14 | 13 | 5 | 1–4 | 11 | 8.5 |
| 250° C. × 16h | 15 | 15 | 7 | 1–4 | 12 | 8.3 |

Table 3 shows that the muds containing a sodium salt of SIMA as a dispersant remained stable even under the hostile temperature condition of 250° C.

EXAMPLE 19

Ten (10.0) g of the copolymer prepared in Example 7 was added to 50 g of 98% sulfuric acid to perform sulfonation reaction at 40° C. for 3 h. After completion of the reaction, liming sodation was performed to remove residual sulfuric acid as gypsum and to convert the sulfonated product to a sodium salt form. As a result, an aqueous solution of Na salt of the sulfonated copolymer was obtained.

Testing

The performance of the fluidizing agent thus prepared was evaluated by performing the following tests on a mortar composition whose recipe is shown in Table 2.

TABLE 2

| Water-to-cement ratio (%) | Mortar Recipe Proportions (g) | | |
|---|---|---|---|
| | Cement | Water | Sand |
| 45.0 | 1000 | 450 | 2000 |

Cement: normal portland cement (product of Mitsubishi Mining & Cement Co., Ltd.)
Sand: produced in the Sakuragawa River in Ibaragi, Japan (FM, fineness modulus = 2.45)
Water: well water Water, cement and the liquefying agent (0.4 wt % of cement on a solids basis) were put into a cement mixing vessel and mixed for 30 seconds. Sand was added with stirring over a period of 30 seconds, followed by mixing for and additional 60 seconds. After standing for 20 seconds, the mortar adhering to the wall of the container and to the surface of the paddle was scraped off, followed by remixing for 120 seconds.

Evaluation

Evaluations of fluidity, resistance to time-dependent change in fluidity and air entrainment were conducted on the compositions prepared in Examples and Comparative Example.

Fluidity evaluation was performed by a mini-slump cone test (mortar test) adapted from the slump test described in JIS A 1101.

Mini-slump cone test

Using a mini-slump cone 15 cm high, a slump test was conducted on each of the mortar compositions by the method described in JIS A 1101.

Figure 1:
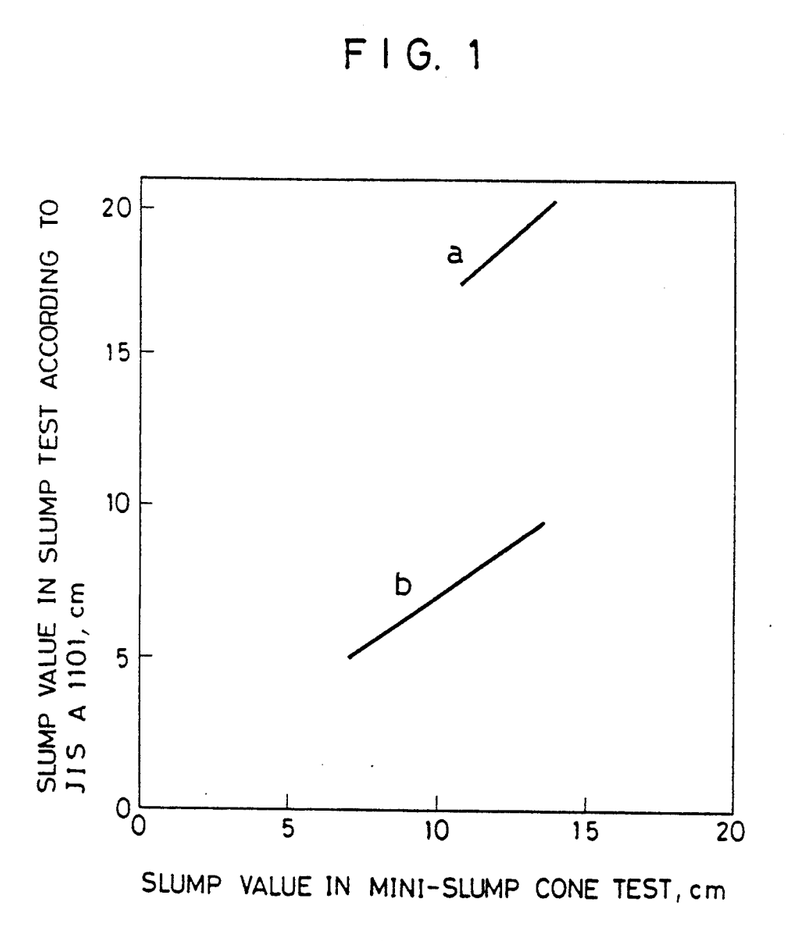
FIG. 1 is a graph showing the correlation between the slump values obtained in a mini-slump cone test and those obtained in the slump test specified in JIS, or Japanese Industrial Standard, A1101.

The mini-slump cone test is a convenient method adapted for evaluating the fluidity of various cement additives. As shown in FIG. 1, the results of this test are in good agreement with those obtained by performing a slump test in accordance with the method described in JIS A 1101. FIG. 1 is a graph showing the correlation between the results of a slump test conducted in accordance with JIS A 1101 on a commercial fluidizing agent (Na salt of the condensation product of naphthalenesulfonic acid and formaldehyde) and the results of a mini-slump cone test conducted on the same test sample. Line (a) represents the correlation for initial slump values and line (b) the correlation for slump values after 60 min.

The resistance to time-dependent change in slump was also evaluated by a mini-slump cone test for mortar compositions since it will give more distinct results.

A portion of the mortar thus prepared was placed into a mini-slump cone 15 cm high and the slump of the mortar as determined after removal of the cone was 11.9 cm.

Another portion of the mortar was left to stand for 60 minutes and thereafter mixed for another 1 minute. The slump of the mortar as determined by the same method as described above was 11.5 cm. The residual slump (%) as determined by the following formula was 96.6%.

$$\text{Residual slump (\%)} = \frac{\text{slump after 60 min}}{\text{slump after 0 min}} \times 100$$

EXAMPLE 20

Ten (10.0 g) of the copolymer prepared in Example 9 was added to 50 g of 98% sulfuric acid to perform sulfonation reaction at 40° C. for 3 h. After completion of the reaction, the sulfonated product was neutralized with calcium hydroxide to remove residual sulfuric acid as gypsum and to obtain an aqueous solution of the Ca salt of the sulfonated copolymer.

Testing

The test procedures were the same as those followed in Example 19. The results are shown in Table 3.

EXAMPLE 21

Preparation

An aqueous solution of a Na salt of the sulfonation product of the copolymer prepared in Example 5 was prepared as in Example 19 except that indene was replaced by methylindene.

Testing

The test procedures were the same as those followed in Example 19. The results are shown in Table 3.

COMPARATIVE EXAMPLE 3

Using a commercial cement admixture (i.e. a sodium salt of naphthalenesulfonic acid-formaldehyde condensate), a mortar was made and subjected to tests as in Example 19. The results are shown in Table 3.

COMPARATIVE EXAMPLE 4

Using a commercial salt of sulfonated styrene/maleic anhydride copolymer (trade name: S-SMA 1000), a mortar was made and subjected to tests as in Example 19. The results are shown in Table 3.

COMPARATIVE EXAMPLE 5

A mortar was made as in Example 28 except that no admixture was used. The results of tests conducted on this mortar as in Example 19 are shown in Table 3.

TABLE 3

| | (Results of Mortar Test) Slump (cm) | | Residual slump (%) |
|---|---|---|---|
| | after 0 min | after 60 min | |
| Example 19 | 11.9 | 11.5 | 96.6 |
| Example 20 | 11.7 | 11.1 | 94.9 |
| Example 21 | 11.7 | 11.0 | 94.0 |
| Comparative Example 3 | 11.9 | 8.7 | 73.1 |
| Comparative Example 4 | 11.3 | 10.1 | 89.4 |
| Comparative Example 5 | 9.8 | 7.1 | 72.4 |

EXAMPLE 22

A glass polymerizer (inner capacity, 500 ml) equipped with a stirrer, a dropping funnel and a reflux condenser was charged with 24.5 g (0.25 mol) of maleic anhydride dissolved in 100 ml of methyl ethyl ketone.

Under agitation with the stirrer, the charge was held at the reflux temperature by heating with an external heater. Thereafter, a solution containing 27 g (0.25 mol) of indene and 410 mg of azoisobutyronitrile (AIBN) as a radical polymerization initiator was charged into the overhead dropping funnel and this solution was dripped slowly into the polymerizer over 1 h. After completion of the dripping, the reaction solution was left under reflux for 2 h until the reaction was completed. The reaction solution was thereafter returned to room temperature and gradually added to 200 ml of n-hexane in a precipitating tank (beaker with an inner capacity of 500 ml), whereupon a white precipitate of indenemaleic anhydride copolymer formed. The precipitate was separated by filtration under suction and vacuum-dried to obtain a copolymer of indene and maleic anhydride in a yield of 95 wt % as calculated from equation (1) given hereinabove.

EXAMPLE 23

An indene-maleic anhydride copolymer was prepared as in Example 22 except that 300 mg of benzoyl peroxide was used as a radical reaction initiator. The yield of the copolymer was 93 wt %.

EXAMPLE 24

A glass polymerizer (inner capacity, 500 ml) equipped with a stirrer, a dropping funnel and a reflux condenser was charged with 300 ml of xylene. Under agitation with the stirrer, the charge was held at the reflux temperature by means of an external heater. It was attempted to dissolve 24.5 g (0.25 mol) of maleic anhydride in 27.5 g (0.25 mol) of indene but part of the maleic anhydride remained undissolved. Therefore, an additional amount (50 ml) of xylene was added to make a complete solution of maleic anhydride. To that solution, 250 mg of dicumyl peroxide was added as a radical reaction initiator to make a uniform mixture. This was charged into the overhead dropping funnel. The charge was slowly dripped into the polymerizer over a period of about 1.5 h. After completion of dripping, the reaction solution was left under reflux for 2 h until the reaction was completed. The obtained copolymer was separated by filtration under suction and vacuum -dried to obtain copolymer of indene and maleic anhydride in a yield of 93 wt %.

EXAMPLE 25

An indene-maleic anhydride copolymer was prepared as in Example 24 except that 200 mg of Perbutyl I (tradename of Nippon Oil & Fats Co., Ltd. for a peroxide-based radical reaction initiator)was used as a radical initiator. The yield of this copolymer was 95 wt %.

EXAMPLE 26

An indene-maleic anhydride copolymer was prepared as in Example 24 except that 300 mg of azobisiosbutyronitrile (AIBN) which was an azo-based radical reaction initiator was used as a radical initiator. The yield of this copolymer was 94 wt %.

EXAMPLE 27

A glass polymerizer ( inner capacity, 500 ml) equipped with a stirrer, a dropping funnel and a reflux condenser was charged with 24.5 g (0.25 mol) of maleic anhydride dissolved in 100 ml of methyl ethyl ketone.

Under agitation with the stirrer, the charge was held at the reflux temperature by heating with an external heater. Thereafter, a solution containing 60 g of naphtha oil [with 48% (0.25 mol) of polymerizable components in terms of indene (mol. wt. 116)] and 410 mg of azoisobutyronitrile (AIBN) as a radical polymerization initiator was charged into the overhead dropping funnel and this solution was dripped slowly into the polymerizer over 1 h. After completion of the dripping, the reaction solution was left under reflux for 2 h until the reaction was completed. The reaction solution was thereafter returned to room temperature and gradually added to 300 ml of n-hexane in a precipitating tank (beaker with an inner capacity of 1 L), whereupon a white precipitate of copolymer formed. The precipitate was separated by filtration under suction and vacuumdried to obtain a copolymer of maleic anhydride and polymerizable components in naphtha oil in a yield of 95 wt % as calculated from equation (1) given hereinabove.

Prior to the experiment of synthesis, the compositional analysis of naphtha oil was performed by gas chromatography (GC) and the result was as follows:

| Nonpolymerizable component | 52 wt % | Composition of polymerizable component | | |
|---|---|---|---|---|
| | | (a) indene | (b) styrene | (c) others |
| Polymerizable component | 48 wt % | 81% | 3% | 16% |

The resulting copolymer had a number average molecular weight of 13,500.

A portion (21.4 g) of the thus synthesized copolymer, 7.0 g of methyl alcohol and 50 ml of toluene were charged into a SUS 304 autoclave having an inner capacity of 500 ml. After replacing the atmosphere in the autoclave with a nitrogen gas, the contents of the autoclave were heated to 170° C. with an external heater and reaction was carried out at that temperature for 2 h. Thereafter, toluene and methyl alcohol were distilled off under vacuum and 50 mg of the resulting esterified copolymer was dissolved in 1 ml of deuterated chloroform. By proton NMR, the degree of esterification of the copolymer was found to be 50%.

EXAMPLES 28–39

Indene-maleic anhydride copolymers were esterified as in Example 27 except that the amount of methyl alcohol was varied as shown in Table 6 below. The results are also shown in Table 4.

TABLE 4

| | Methyl alcohol (%) | Degree of esterification |
|---|---|---|
| Example 27 | 7.0 | 50 |
| Example 28 | 3.5 | 40 |
| Example 29 | 3.0 | 34 |
| Example 30 | 2.0 | 20 |
| Example 31 | 1.0 | 10 |
| Example 32 | 0.5 | 5 |

What is claimed is:

1. An alkali metal salt, an alkaline earth metal salt and/or ammonium salt of the sulfonation product of an esterified copolymer produced by polymerizing about one part by mole of maleic anhydride and about one part by mole of polymerizable component of naphtha oil, said naphtha oil containing at least 5 wt % of polymerizable components consisting essentially of
   (a) 70–99% by weight of indene;
   (b) 0.5–29.5% by weight of styrene; and
   (c) 0.5–29.5% by weight in total of one or more compounds selected from among α-methylstyrene, methylstyrene, methylindene, dimethylstyrene, trimethylstyrene, coumarone and dicyclopentadiene.

2. A dispersant containing at least one compound selected from the group consisting of an alkali metal salt, an alkaline earth metal salt and an ammonium salt according to claim 1.

3. A mud stabilizer for use in boring through hot formations which comprises the dispersant of claim 2, a clay mineral and water.

4. A plasticizer for use in cement mixes to reduce slump loss which contains the dispersant of claim 2.

5. A process for producing the alkali metal salt, the alkaline earth metal salt and the ammonium salt of the sulfonation product of the copolymer according to claim 1 comprising the steps of:

reacting by radical polymerization between about one part by mole of maleic anhydride and about one part by mole of polymerizable component of naphtha oil, said naphtha oil containing at least 5% by weight of polymerizable components consisting essentially of:
(a) 70–99% by weight of indene;
(b) 0.5–29.5% by weight of styrene; and
(c) 0.5–29.5% by weight in total of one or more compounds selected from among α-methylstyrene, methylstyrene, methylindene, dimethylstyrene, trimethylstyrene, coumarone and dicyclopentadiene.

* * * * *